(12) United States Patent
Ring et al.

(10) Patent No.: US 11,680,852 B2
(45) Date of Patent: Jun. 20, 2023

(54) TEMPERATURE MEASUREMENT SYSTEM

(71) Applicant: Eaton Intelligent Power Limited, Dublin (IE)

(72) Inventors: Christopher Ring, Derry, NH (US); Jon C. Beaver, Syracuse, NY (US); Stewart John Parfitt, Hertfordshire (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 7 days.

(21) Appl. No.: 17/326,748

(22) Filed: May 21, 2021

(65) Prior Publication Data

US 2021/0364361 A1 Nov. 25, 2021

Related U.S. Application Data

(60) Provisional application No. 63/029,133, filed on May 22, 2020.

(51) Int. Cl.
*G01J 5/48* (2022.01)
*G01J 5/06* (2022.01)
*H04N 5/33* (2023.01)
*G01J 5/00* (2022.01)

(52) U.S. Cl.
CPC . *G01J 5/48* (2013.01); *G01J 5/06* (2013.01); *H04N 5/33* (2013.01); *G01J 5/064* (2022.01); *G01J 2005/0077* (2013.01)

(58) Field of Classification Search
CPC ...... G01J 5/48; G01J 5/06; G01J 5/064; G01J 2005/0077; G01J 5/53; G01J 5/0025; G01J 5/00; H04N 5/33
See application file for complete search history.

(56) References Cited

U.S. PATENT DOCUMENTS

| | | |
|---|---|---|
| 7,340,293 B2 | 3/2008 | McQuilkin |
| 7,457,441 B2 | 11/2008 | Hartlove |
| 8,167,483 B2 | 5/2012 | Jensen |
| 8,282,274 B2 | 10/2012 | Pang et al. |
| 8,360,986 B2 | 1/2013 | Farag et al. |

(Continued)

FOREIGN PATENT DOCUMENTS

| | | |
|---|---|---|
| CN | 101112306 B | 9/2010 |
| CN | 204542079 U | 8/2015 |

(Continued)

OTHER PUBLICATIONS

Extended European Search Report for Application No. 21174548.4, dated Apr. 22, 2022, 13 pages, Munich, Germany.

*Primary Examiner* — Kiho Kim

(74) *Attorney, Agent, or Firm* — Stinson LLP

(57) ABSTRACT

A temperature measurement system includes a thermal camera configured to capture a thermal image of individuals in a viewing space of the thermal camera to detect temperatures of the individuals. A reference device is configured to present a reference temperature for detection by the thermal camera when the reference device is disposed in the viewing space of the thermal camera. The reference device is configured to maintain thermal stability in harsh or hazardous environments so that the system provides accurate and precise temperature detection of the individuals in the viewing space of the thermal camera.

17 Claims, 7 Drawing Sheets

(56) References Cited

U.S. PATENT DOCUMENTS

| | | |
|---|---|---|
| 8,457,922 B2 | 6/2013 | Pompler et al. |
| 9,506,809 B2 | 11/2016 | Shin |
| 9,750,414 B2 | 9/2017 | Lane et al. |
| 10,422,705 B2 | 9/2019 | Yen et al. |
| 10,502,629 B2 | 12/2019 | Johnson |
| 2004/0254472 A1 | 12/2004 | McQuilkin |
| 2007/0153871 A1 | 7/2007 | Fraden |
| 2008/0154138 A1 | 6/2008 | McQuilkin |
| 2013/0215928 A1 | 8/2013 | Bellifemine |
| 2014/0148705 A1 | 5/2014 | Van Treeck et al. |
| 2016/0073897 A1 | 3/2016 | Khachaturian et al. |
| 2017/0344833 A1 | 11/2017 | Ahlberg |

FOREIGN PATENT DOCUMENTS

| | | | |
|---|---|---|---|
| CN | 104434048 B | 8/2016 | |
| CN | 109870240 A | 6/2019 | |
| CN | 107049253 B | 4/2020 | |
| EP | 2764686 B1 | 10/2019 | |
| JP | 2000050253 A * | 2/2000 | |
| JP | 2011047813 A | 3/2011 | |
| WO | 2017015731 A1 | 2/2017 | |
| WO | WO-2019088814 A1 * | 5/2019 | ................ G01J 5/52 |

* cited by examiner

TEMPERATURE MEASUREMENT SYSTEM

CROSS-REFERENCE TO RELATED APPLICATION

This application claims priority to U.S. Provisional Patent Application Ser. No. 63/029,133, filed May 22, 2020, and which is hereby incorporated by reference in its entirety.

FIELD

The present disclosure generally relates to a temperature measurement system, and more particularly to an infrared temperature measurement system configured for use in harsh or hazardous environments.

BACKGROUND

Conventional temperature measurement systems are restricted for use in temperature controlled environments such as inside buildings or other controlled environments (e.g., airports, bus terminals, courthouses, etc.). It is known to use conventional temperature measurement systems for monitoring the temperature of individuals within an area. However, the measurement precision of these conventional systems for fever detection, in particular, is restricted to a very limited temperature range (e.g., ~36° C. to 41° C.).

Outdoor electrical products are consistently exposed to extremely harsh environments, such as temperatures ranging from −60° C. to +60° C. with constant exposure to ultraviolet radiation, rain, salt, fog, moisture, humidity, snowfall, ozone, thermal cycling, corrosive chemicals, and the like. Conventional temperature measurement systems are not equipped for outdoor use to accurately measure human body/skin temperature in harsh and hazardous environments.

SUMMARY

In one aspect, a temperature measurement system generally comprises a thermal camera configured to capture a thermal image of individuals in a viewing space of the thermal camera to detect temperatures of the individuals. A reference device is configured to present a reference temperature for detection by the thermal camera when the reference device is disposed in the viewing space of the thermal camera. The reference device is configured to maintain thermal stability in harsh or hazardous environments so that the system provides accurate and precise temperature detection of the individuals in the viewing space of the thermal camera.

In another aspect, a temperature measurement system generally comprises a thermal camera configured to capture a thermal image of an individual in a viewing space of the thermal camera to detect a temperature of the individual. A reference device is in communication with the thermal camera and configured to emit a reference temperature for detection by the thermal camera when the reference device is disposed in the viewing space of the thermal camera. One of the thermal camera and the reference device is configured to detect a condition of a surrounding environment. The temperature of the individual being determined based on the condition of the surrounding environment.

BRIEF DESCRIPTION OF THE DRAWINGS

Corresponding reference characters indicate corresponding parts throughout the drawings.

DETAILED DESCRIPTION

Figure 1:
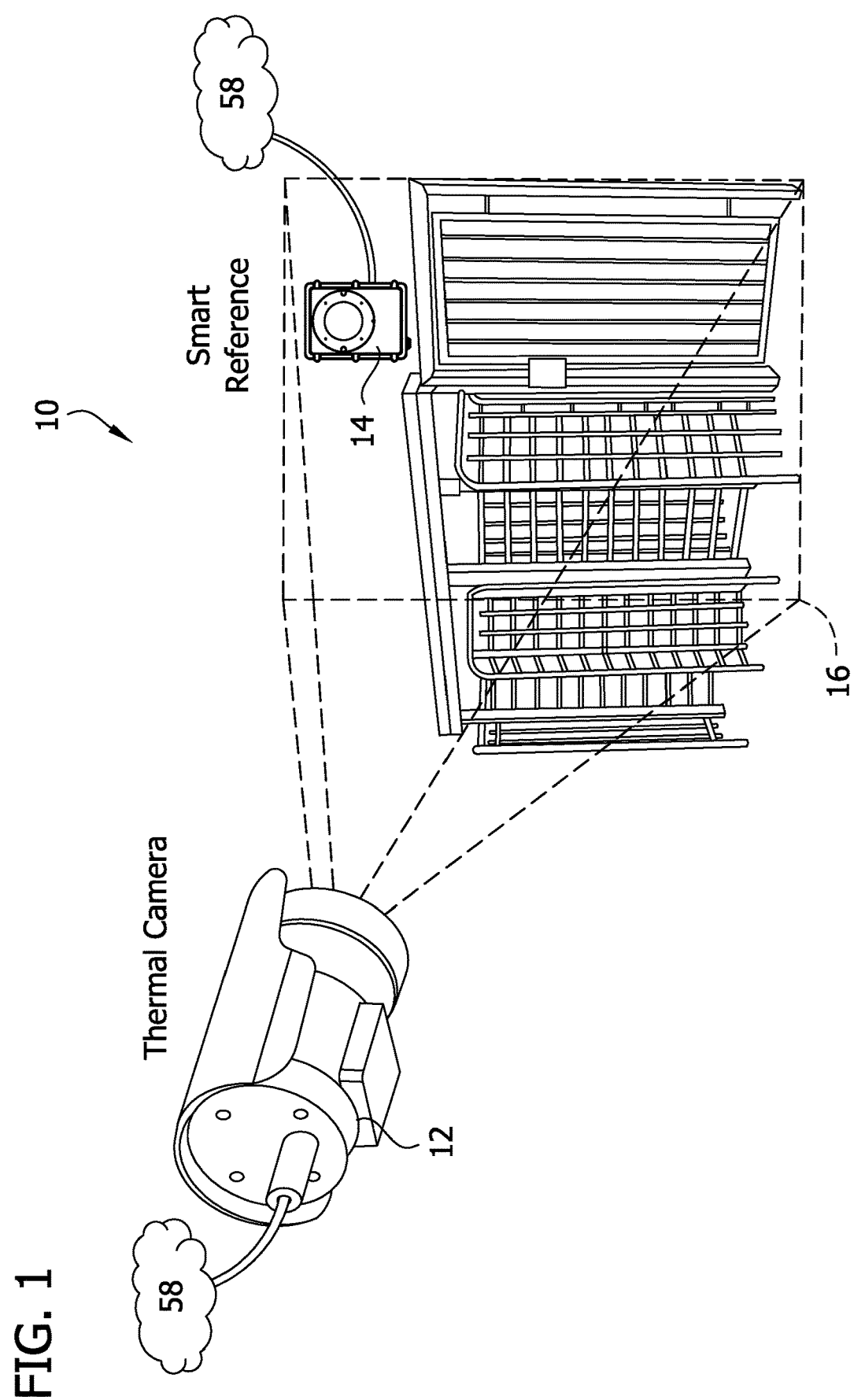
FIG. 1 is an illustration of a temperature measurement system.

Referring to FIG. 1, a temperature measurement system of the present disclosure is generally indicated at 10. The system may comprise a thermal camera 12 configured to acquire a thermal image to detect a temperature of an object or area, and a reference device 14 configured to emit a reference temperature for being detected by the thermal camera. In one embodiment, the thermal camera 12 comprises an infrared camera configured to recognize and capture different levels of infrared light emitted from an object to detect the temperature of the measured object. Similarly, the reference device 14 may comprise an infrared temperature reference configured to emit infrared radiation. As will be explained in greater detail below, the reference device 14 is equipped for indoor and outdoor use. Therefore, the thermal camera 12 may detect the infrared radiation emitted from the reference device 14 to provide the system 10 with a consistent reference temperature for use in measuring the temperature of objects within a viewing space 16 of the thermal camera. Thus, the temperature measurement system 10 provides high precision, non-contact indoor and outdoor temperature measurement of objects within the viewing space 16 of the thermal camera 12. Accordingly, and in one embodiment, the temperature measurement system 10 may be used for measuring the temperature of individuals within an area, such as individuals entering a building or facility for the purposes of fever detection of the individuals. As will be explained in greater detail below, the temperature measurement system 10 could be used for other purposes without departing from the scope of the disclosure. In one embodiment, the camera 12 is a thermal camera. However, the camera could be a standard optical camera used in conjunction with a thermal camera.

Additionally, the temperature measurement system 10 is configured to accurately and precisely detect the temperature of objects within the viewing space 16 of the thermal camera 12 when the camera and/or viewing space is located within a harsh or hazardous environment. In particular, the reference device 14 is specifically configured to withstand harsh or hazardous environments and maintain its reference temperature within those environments. For example, NEMA sets standards with which an enclosure must comply in order to qualify for use in hazardous environments. A NEMA Type 7 standard applies to enclosures constructed for indoor use in certain hazardous locations. Hazardous locations may be defined by one or more of a number of authorities, including but not limited to National Electric Code (NEC) (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive. Hazardous locations are also set by the International Electrotechnical Commission (IEC). For example, IEC Zone 2 covers explosive gas atmospheres where ignitable concentrations of flammable gases or vapors which are not likely to occur under normal operating conditions and do so only for a short period of time.

Examples of hazardous locations in which example embodiments can be used include, but are not limited to, an airplane hangar, an airplane, a drilling rig (as for oil, gas, or water), a production rig (as for oil or gas), a refinery, a chemical plant, a power plant, a mining operation, a steel mill, and the like.

Referring to FIGS. 2-7, the reference device 14 comprises a housing 18 at least partially enclosing the internal components of the reference device. In the illustrated embodiment, the housing 18 comprises a rear housing member 20 and a front housing member or cover 22 attached to the housing member. Fasteners 24 (FIGS. 5 and 7) secure the rear housing member 20 to the cover 22. However, the rear housing member 20 could be secured to the cover 22 by other means without departing from the scope of the disclosure. The cover 22 defines an opening 26 (FIG. 7) in a front face of the cover for receiving a portion of a shroud 28. The shroud 28 secures a thermal load 30 within the housing 18 and exposes at least a portion of the thermal load to an exterior of the reference device 14. As will be explained in greater detail below, the thermal load 30 is configured to present an emissive surface in the reference device 14 in a manner that approximates the human body so that the reference device provides a highly stable physical temperature reference for the thermal camera 12 that replicates the manner in which infrared radiation is emitted from the human body. The rear housing member 20, cover 22, and shroud 28 together define the housing 18. However, it will be understood that the housing 18 may comprise a single housing structure or some other combination of housing components without departing from the scope of the disclosure. The rear housing member 22 also includes a plurality of fins 32 for dissipating heat from the reference device 14. A gland or plug 34 may also be disposed at a bottom of the housing 18 for providing connection of the internal components of the reference device 14 to power and/or signal devices.

Figure 2:
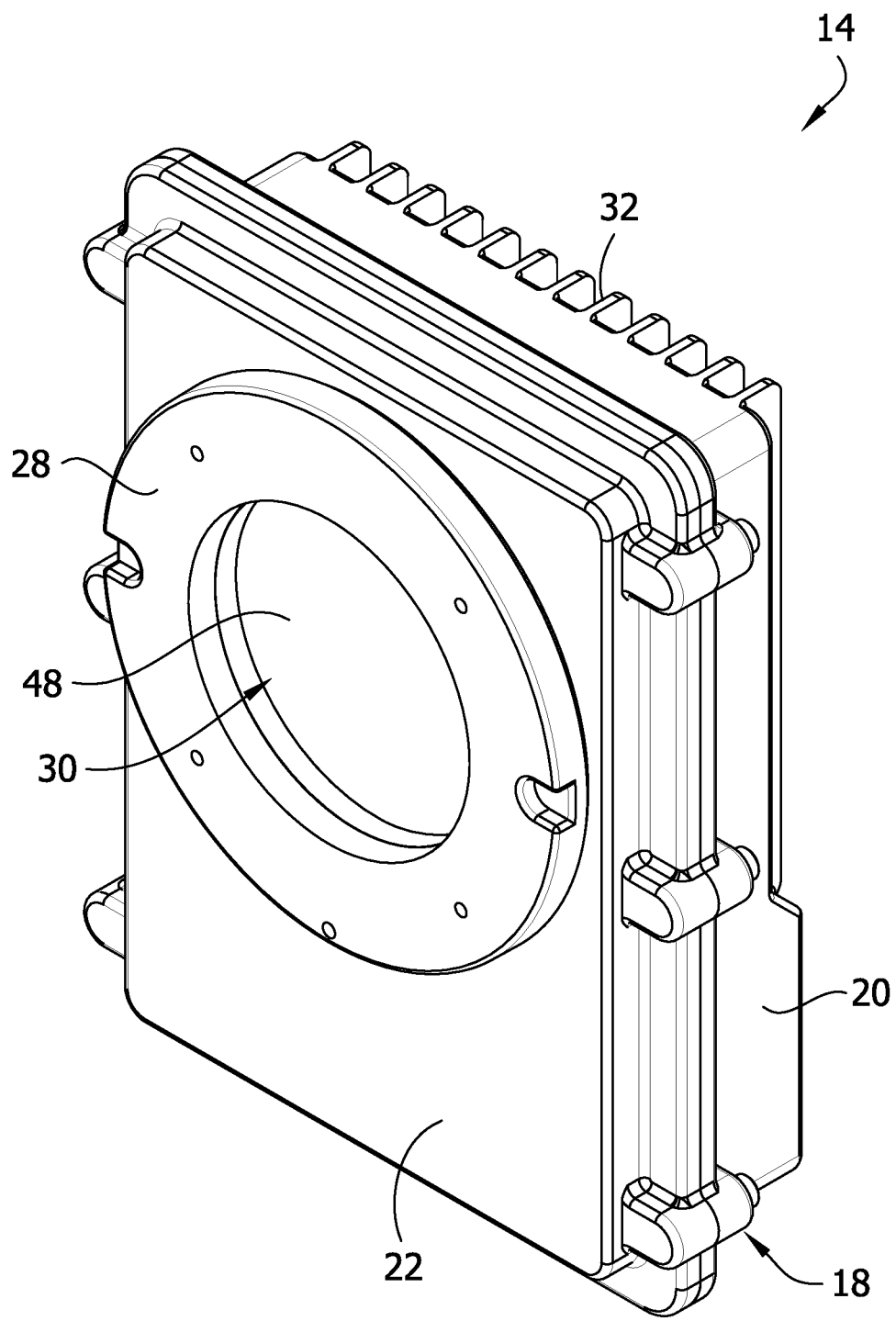
FIG. 2 is a perspective of a reference device of the system.
Figure 3:
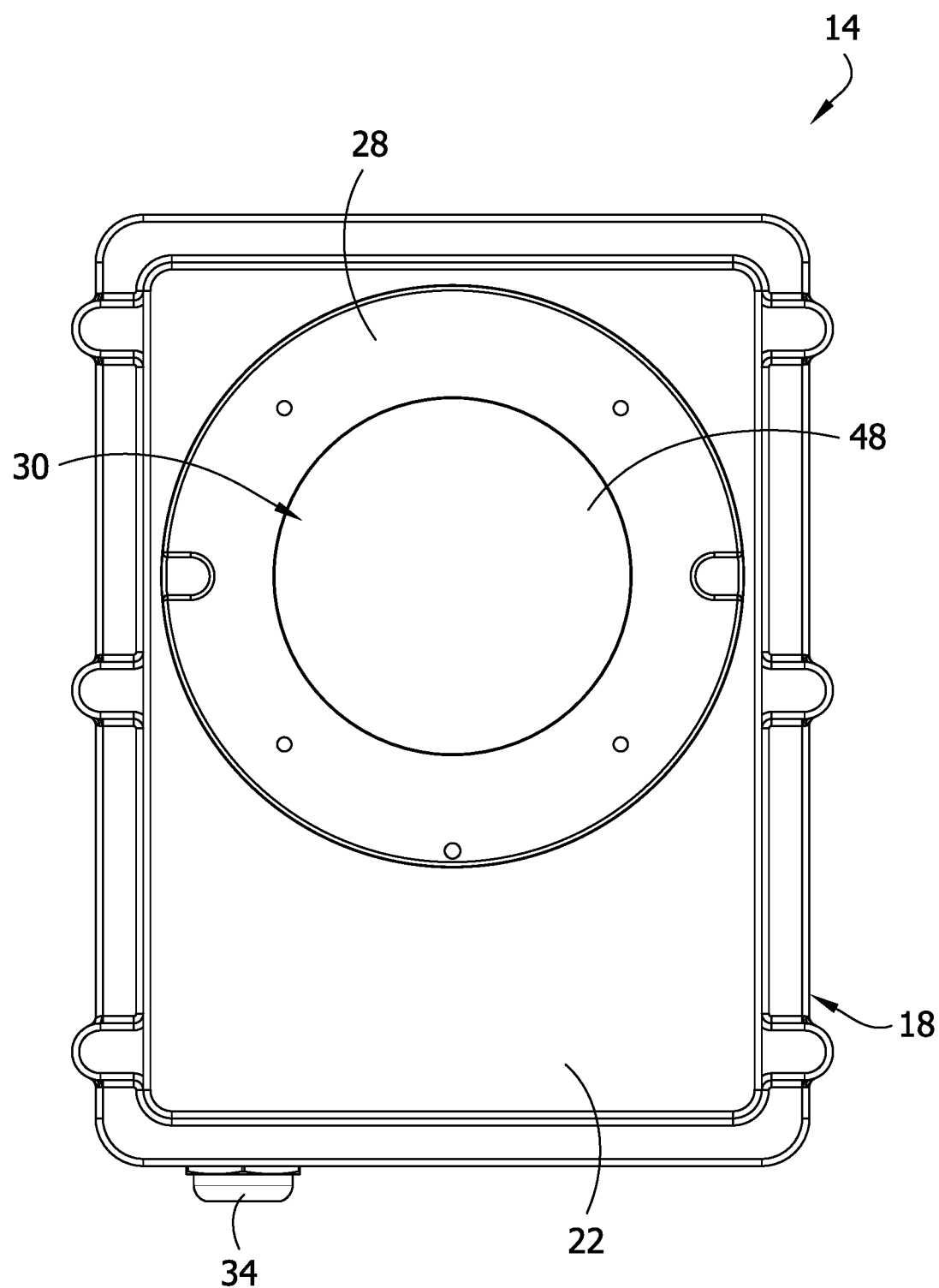
FIG. 3 is a front view of the reference device.
Figure 4:
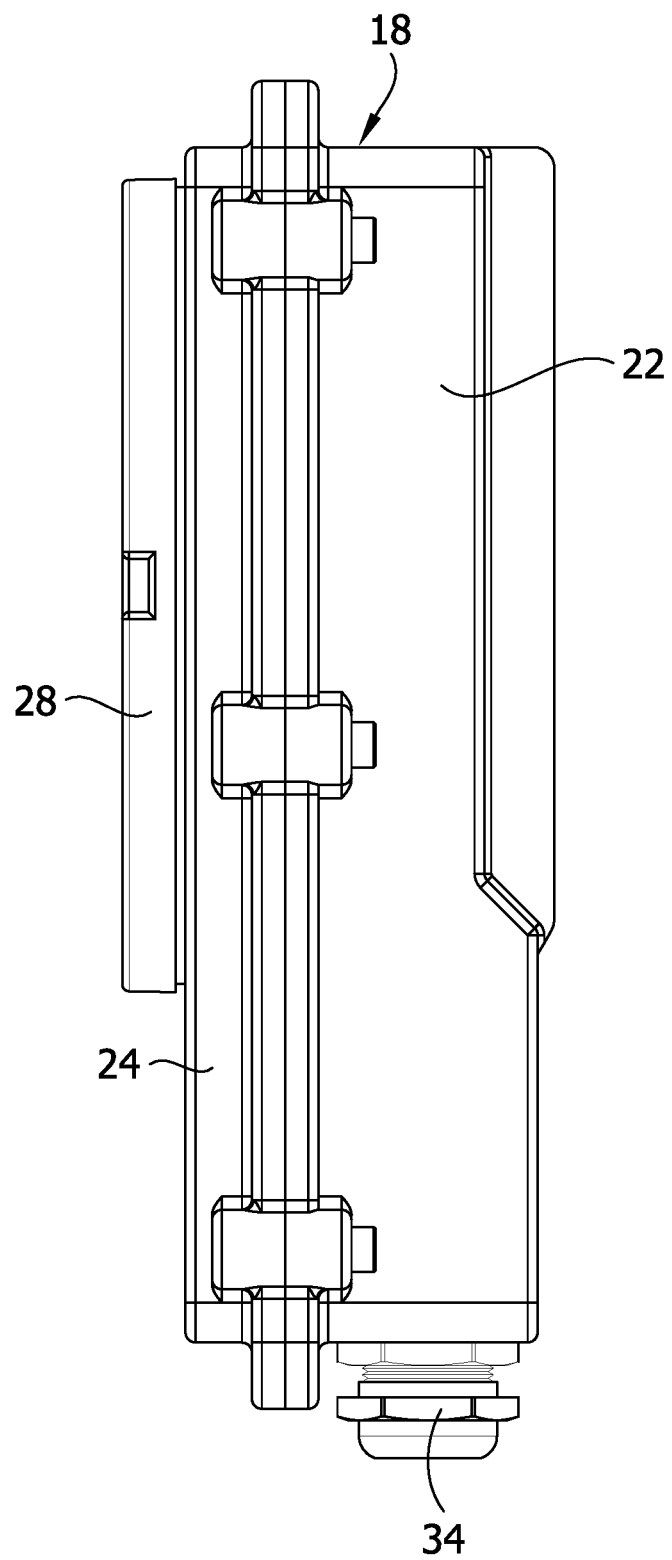
FIG. 4 is a side view of the reference device.
Figure 5:
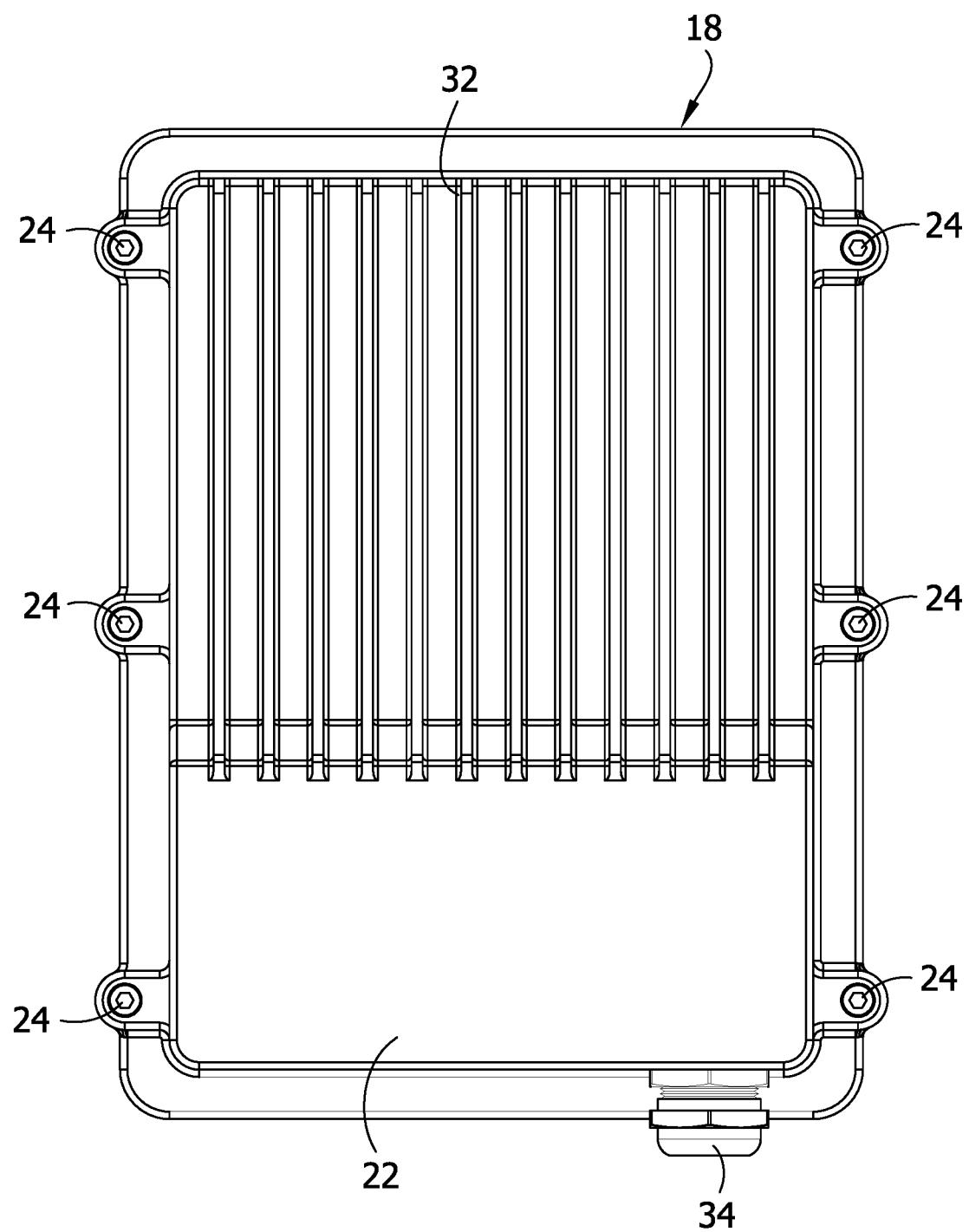
FIG. 5 is a rear view of the reference device.
Figure 6:
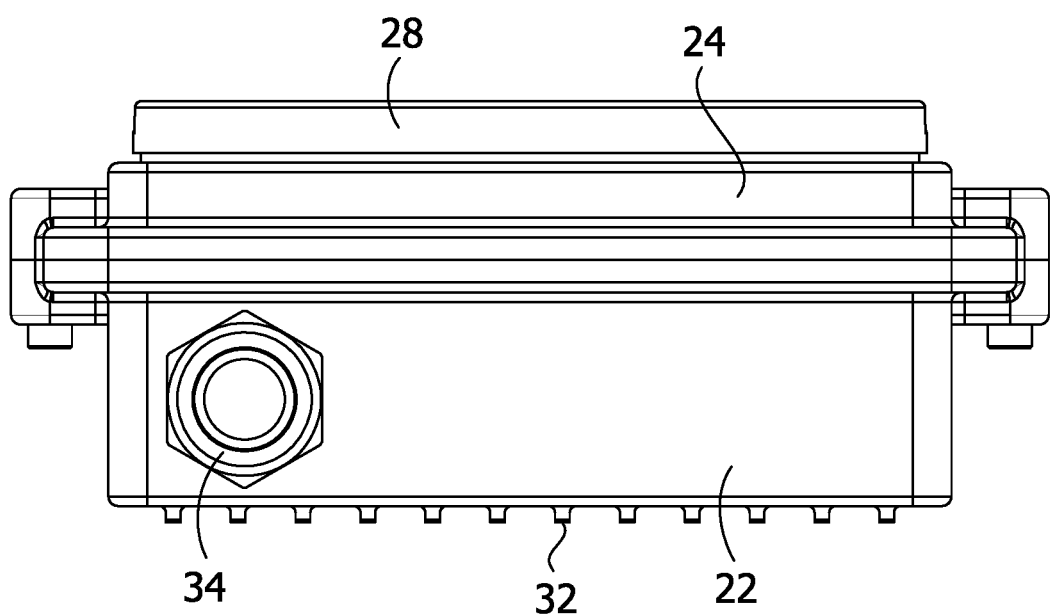
FIG. 6 is a bottom view of the reference device.
Figure 7:
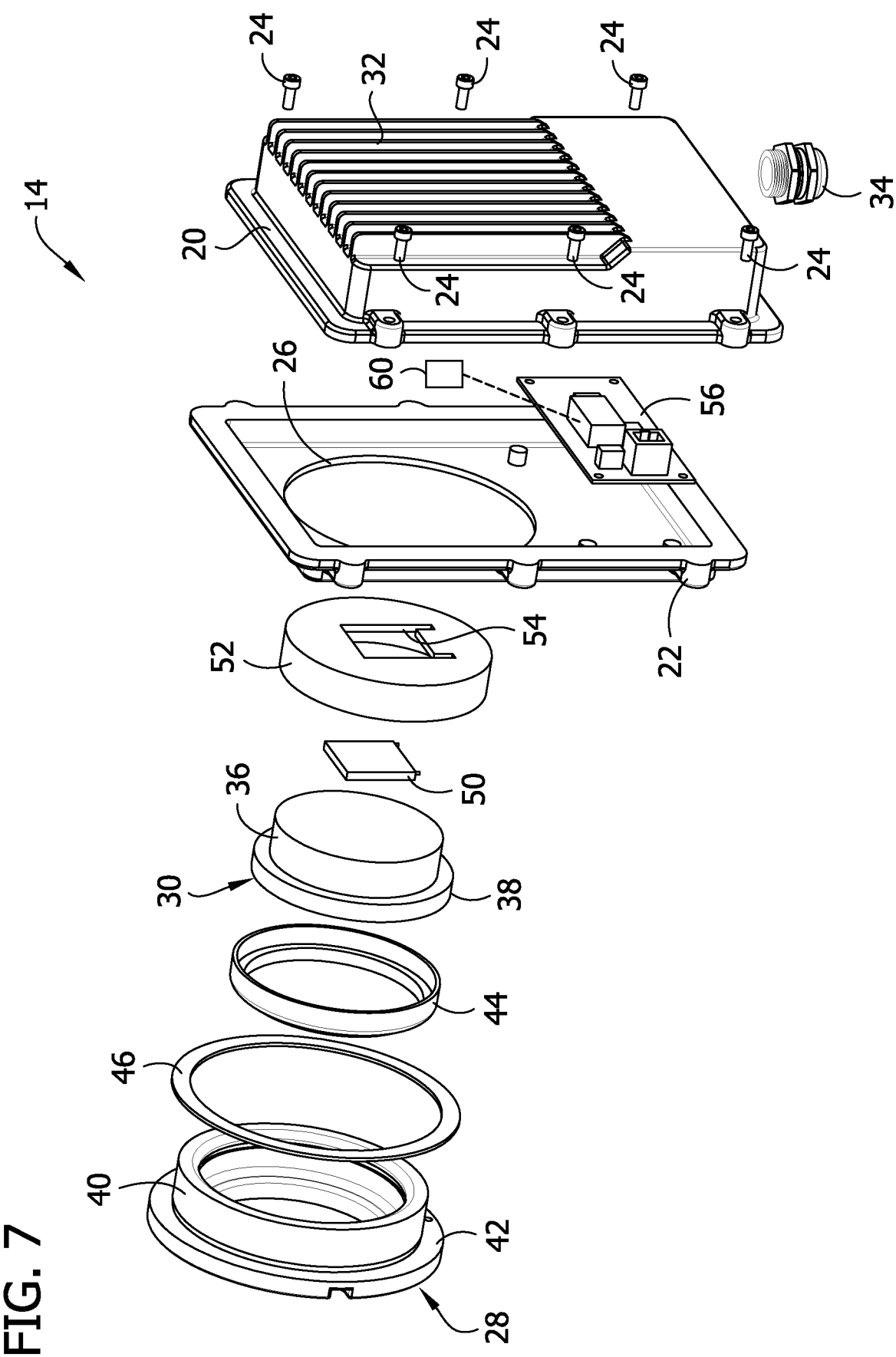
FIG. 7 is an explode view of the reference device.

Referring to FIGS. 2, 3, and 7, the thermal load 30 is disposed in the housing 18 and retained in the housing by the shroud 28. The thermal load 30 includes a cylindrical base 36 and an annular flange 38 extending radially outward from a front end portion of the base. The shroud 28 includes an annular ring 40 and an annular flange 42 extending radially outward from a front end of the annular ring. The annular ring 40 of the shroud 28 is received in the opening 26 in the cover 22 and the annular flange 42 of the shroud seats against an outer surface of the cover. The shroud 28 may be secured to the cover 22 by any suitable means. A first sealing gasket 44 seals between the annular flange 38 of the thermal load 30 and an inner surface of the annular ring 40 of the shroud 28, and a second sealing gasket 46 seals between the annular flange 42 of the shroud and the outer surface of the cover 22. Thus, the reference device 14 is sealed to configure the device to withstand outdoor weather conditions such as icing and high winds enabling the reference device to be used in harsh or hazardous environments. In one embodiment, the reference device 14 is an IP66 rated enclosure.

The thermal load 30 is configured to emit infrared radiation for producing an effect on the air temperature around the thermal load. A load surface 48 (FIGS. 2 and 3) on the thermal load 30 may be configured to approximate human skin emissivity conditions such that the thermal load emits infrared radiation in a manner consistent with the human body. In one embodiment, a coating is applied to the load surface 48 to approximate human skin emissivity properties. It is envisioned that the thermal load 30 could be configured in other ways and may approximate human skin emissivity using other means without departing from the scope of the disclosure.

A peltier device 50 (FIG. 7) is in thermal communication with the thermal load 30 for controlling a temperature of the thermal load. Thus, the peltier device 50 comprises a heating/cooling element for increasing and decreasing the temperature of the thermal load 30. The fins 32 on the rear housing member 20 allow the reference device 14 to utilize convection for the heating and cooling of the thermal load 30. In one embodiment, the peltier device 50 is operated to maintain the thermal load 30 at a temperature close to the temperature of human skin.

An insulator 52 is mounted within the housing 18 and insulates the thermal load 30 from the remainder of the reference device 14, and in particular the rear housing member 20. The insulator 52 also locates the peltier device 50 in relation to the thermal load 30. In the illustrated embodiment, the insulator 52 defines a cutout 54 for receiving the peltier device 50 in the insulator. The insulator 52 also receives at least a portion of the cylindrical base 36 of the thermal load 30 within an opening (not shown) in the insulator. Thus, the peltier device 50 is held in close relation, and in one embodiment, in direct contact with thermal load 30. Therefore, the peltier device 50 is able to effectively and efficiently control the temperature of the thermal load 30.

A controller 56 is mounted within the housing 18 and configured to control operation of the peltier device 50 for heating and cooling the thermal load 30. The gland 34 provides access to the controller 56 for connecting power/signal lines to the controller for operation of the reference device 14. It will be understood that the internal components of the reference device 14 could be constructed and arranged in other ways without departing from the scope of the disclosure.

The reference device 14 may also be configured to measure the surrounding environmental conditions and communicate those conditions to the camera 12 to adjust the temperature calculations of system 10 to account for the environmental conditions in which the measurements are being taken. For example, the reference device 14 may include a temperature sensor and/or a humidity sensor 60 to provide the reference device with data for controlling the operation (i.e., temperature) of the thermal load 30 of the reference device and/or for communicating with the camera 12 to provide the camera with additional data for controlling operation of the camera. As such, the reference device 14 and camera 12 may adjust their operation in view of the additional data. Additionally, the thermal camera 12 may be configured to provide environmental feedback other than the thermal measurements provided by the camera. For instance, the camera 12 may monitor the level of particulates in the air, and account for the particulate levels when measuring the temperatures of the objects in the viewing space 16. Further, environmental conditions such as solar gain from direct sunlight, wind chill, dust and debris can also affect the infrared readings of the camera 12. Therefore, the system 10 may be configured to detect these additional environmental conditions and account for these conditions when calculating the temperatures of the object's in the viewing space 16 of the camera 12. It is envisioned that one of or both of the camera 12 and reference device 14 may be configured to measure these additional environmental conditions.

The reference device 14, in part, allows the system 10 to be used in both benign and harsh/hazardous environments.

This is because the configuration of the reference device 14 allows the reference device to maintain thermal stability over a wide range of surrounding temperatures. For example, the reference device 14 is configured to maintain thermal stability within a surrounding environment having temperatures between about −60° C. to about 60° C. The reference device 14 is also configured to withstand harsh outdoor weather events. For instance, the shroud 28 provides a guard or barrier around the thermal load 30 to shield the thermal load from the surrounding environment. Thus, the shroud 28 can block dust and debris from damaging the thermal load 30 thereby permitting the thermal load to retain normal operation during harsh weather events. Additionally, the shroud 28 is configured to have low emissivity and low conductivity so that the thermal output of the shroud does not alter the thermal reading of the thermal load 30 when it is viewed by the thermal camera 12. Therefore, the thermal camera 12 is able to detect precise temperature measurements of the reference device 14 regardless of the surrounding environment. Accordingly, the high thermal stability reference device 14 configures the system 10 to provide precise infrared temperature measurements of objects in the viewing space 16 of the thermal camera 12. In one embodiment, the accuracy of the temperature readings can be maintained within ±0.3° C.

Further, the ability of the temperature measurement system 10 to make precise temperature measurements of the objects within the viewing space 16 of the thermal camera 12 allows the system to provide effective detection of individual's temperatures within the viewing space of the camera. Thus, in one application, the system 10 may be used to detect fevers of the individuals in the viewing space 16 of the camera 12 for the purpose of identifying individuals who may pose a danger to themselves or to other individuals within a communal space. This is accomplished by the thermal camera 12 being able to measure the temperature of the individuals in the viewing space 16 of the camera, and measure the temperature of the thermal load 30 of the reference device 14 which is also located in the viewing space and emits infrared radiation in a manner consistent with that of the human body. In one embodiment, the camera 12 may focus on the temperature of a tear duct of the individual for obtaining an accurate reading of the individual's body temperature. Thus, the system 10 uses the temperature of the reference device 14 as a reference point for interpreting the readings from the individuals in the viewing space 16 of the camera 12. And because the temperature of the reference device 14 remains stable across a wide range of surrounding environmental temperatures, the reference device provides a reliable reference temperature for comparing against the temperature readings of the individuals regardless of the environmental conditions in which the reference device is disposed. Therefore, the system 10 is able to produce accurate and precise temperature readings of the individuals in the viewing space 16 of the camera 12 for the purpose of determining if any of the individuals have an elevated temperature consistent with a fever. This information can be used to alert staff or other individuals of the potential health risk that the individuals with the fever temperatures may pose to themselves or the other individuals in the communal space. Further, the system 10 may be linked to an access control system associated with the viewing space 16 to limit the individuals from entering a building or facility based on the individual's measured body temperatures.

Additionally or alternatively, the system 10 may be used to monitor other conditions of the individuals in the viewing space 16 of the camera 12. In one embodiment, the system 10 may detect if an individual is coughing or may detect a general appearance of the individual. For example, the system 10 may detect whether an individual is wearing certain identification items such as an ID/access badge, or other articles such as safety gear (e.g., glass, boots, etc.). Thus, the system 10 can provide a compliance function for ensuring that the individuals in a certain area are adhering to various rules and regulations. For instance, PPE rule adherence may be monitored using the system 10. Additionally, the system 10 may be used to monitor individuals before entering a harsh or hazardous environment, during exposure to a harsh or hazardous environment, and after being exposed to a harsh or hazardous environment.

Referring to FIG. 1, the thermal camera 12 and reference device 14 may be connected to a network 58 to configure the system 10 to provide real-time analysis of the viewing space 16 of the camera 12. The camera 12, reference device 14, and network 58 may operate in a closed loop system where both the camera and reference device are configured to communicate directly with the network. The camera 12 and reference device 14 are also configured to communicate with each other to facilitate data exchange between the camera and reference device. Therefore, if the reference device 14 changes the temperature of the thermal load 30 from a previously programmed or indicated temperature, the reference device can communicate with the camera 12 and/or the network 58 to allow the system 10 to adjust for the change in temperature of the reference device. For example, the reference device 14 may be set to maintain a reference temperature of about 36° C. However, if the reference device 14 and/or surrounding environment causes the reference temperature to change, the reference device 14 can notify the camera 12 or network 58 to alert the system 10 of the temperature change. The network 58 may also be connected to a CCTV system or a cloud based data acquisition and analysis system to link the system 10 to other connected systems for communicating information outside of the closed loop system. The system 10, including the camera 12 and reference device 14, when connected to a networked CCTV system, or the like, may also provide additional Advanced Data Analytics providing more comprehensive measurement data about the individual being monitored.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the compositions without departing from the scope of the disclosure, it is intended that all matter contained in the above description shall be interpreted as illustrative and not in a limiting sense.

The invention claimed is:
1. A temperature measurement system comprising:
a thermal camera configured to capture a thermal image of individuals in a viewing space of the thermal camera to detect temperatures of the individuals; and a reference device configured to present a reference temperature for detection by the thermal camera when the reference device is disposed in the viewing space of the thermal camera, the reference device being configured to maintain thermal stability in harsh or hazardous environments so that the system provides accurate and precise temperature detection of the individuals in the viewing space of the thermal camera, wherein the reference device includes a housing and a thermal load partially disposed in the housing such that at least a portion of the thermal load is disposed at an exterior of the housing, and wherein the housing defines a shroud projecting forward of the thermal load and positioned to shield the thermal load from a surrounding environment.

2. The system of claim 1, wherein the reference device is configured to maintain thermal stability in a surrounding environment having temperatures between about −60° C. to about 60° C.

3. The system of claim 1, wherein an accuracy of the temperature detection can be maintained within ±0.3° C.

4. The system of claim 1, wherein the thermal load has infrared radiation emissivity properties that approximate human skin.

5. The system of claim 1, further comprising a network in communication with both the thermal camera and reference device whereby the reference device is configured to communicate directly with the network.

6. The system of claim 1, wherein the thermal camera and reference device are connected to a CCTV system.

7. The system of claim 1, wherein the reference device includes a first sealing gasket sealing between an annular flange of the thermal load and an inner surface of a shroud, and a second sealing gasket sealing between the annular flange and an outer surface of a cover.

8. The system of claim 1, wherein the reference device includes an insulator mounted in the reference device that insulates the thermal load from a remainder of the reference device.

9. A temperature measurement system comprising:
a thermal camera configured to capture a thermal image of an individual in a viewing space of the thermal camera to detect a temperature of the individual; and
a reference device in communication with the thermal camera and configured to emit a reference temperature for detection by the thermal camera when the reference device is disposed in the viewing space of the thermal camera, the reference device being configured to detect a condition of a surrounding environment, the temperature of the individual being determined based on the condition of the surrounding environment.

10. The system of claim 9, wherein the condition of the surrounding environment includes one of humidity, temperature, solar gain, wind chill, and particulate level.

11. The system of claim 10, wherein the reference device is configured to detect the condition of the surrounding environment.

12. The system of claim 9, further comprising a network in communication with both the thermal camera and reference device whereby the reference device is configured to communicate directly with the network.

13. The system of claim 9, wherein the thermal camera and reference device are connected to a CCTV system.

14. The system of claim 9, wherein an accuracy of the temperature detection can be maintained within ±0.3° C.

15. The system of claim 9, wherein the reference device includes a housing and a thermal load disposed at least partially in the housing for emitting infrared radiation, the housing defining a shroud positioned to shield the thermal load from the surrounding environment.

16. The system of claim 9, wherein the reference device includes a housing and a thermal load disposed at least partially in the housing such that at least a portion of the thermal load is exposed to an exterior of the housing, the thermal load having infrared radiation emissivity properties that approximate human skin.

17. A temperature measurement system comprising:
a thermal camera configured to capture a thermal image of individuals in a viewing space of the thermal camera to detect temperatures of the individuals; and
a reference device configured to present a reference temperature for detection by the thermal camera when the reference device is disposed in the viewing space of the thermal camera, the reference device being configured to maintain thermal stability in harsh or hazardous environments so that the system provides accurate and precise temperature detection of the individuals in the viewing space of the thermal camera, wherein the reference device includes a housing and a thermal load partially disposed in the housing such that at least a portion of the thermal load is disposed at an exterior of the housing, and wherein the reference device includes a first sealing gasket sealing between an annular flange of the thermal load and an inner surface of a shroud, and a second sealing gasket sealing between the annular flange and an outer surface of a cover.

* * * * *